United States Patent
Kitagishi et al.

(10) Patent No.: US 9,090,261 B2
(45) Date of Patent: Jul. 28, 2015

(54) DRIVING ASSIST SYSTEM, DRIVING ASSIST DEVICE, AND DRIVING ASSIST METHOD

(71) Applicant: YAHOO JAPAN CORPORATION, Tokyo (JP)

(72) Inventors: Ikuo Kitagishi, Tokyo (JP); Hiroshi Ota, Tokyo (JP); Yasuhiro Sukemitsu, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 13/954,501

(22) Filed: Jul. 30, 2013

(65) Prior Publication Data

US 2014/0088815 A1 Mar. 27, 2014

(30) Foreign Application Priority Data

Sep. 24, 2012 (JP) ................................. 2012-209785

(51) Int. Cl.
*B60W 50/14* (2012.01)
*G07C 5/00* (2006.01)
(Continued)

(52) U.S. Cl.
CPC ........... *B60W 30/18* (2013.01); *B60W 50/0098* (2013.01); *B60W 50/14* (2013.01); *G07C 5/008* (2013.01); *B60W 2050/0064* (2013.01); *B60W 2050/0075* (2013.01); *B60W 2540/28* (2013.01);
(Continued)

(58) Field of Classification Search
CPC ...... B60W 2540/30; B60W 2540/28; B60W 2050/0089; B60W 2050/0075; B60W 2050/0064; B60W 50/14; B60W 50/0098; B60W 40/09; B60W 30/18; G07C 5/008
See application file for complete search history.

(56) References Cited

U.S. PATENT DOCUMENTS

| | | | |
|---|---|---|---|
| 7,930,096 B2 * | 4/2011 | Kubota et al. | 701/514 |
| 2008/0120175 A1 * | 5/2008 | Doering | 705/14 |

(Continued)

FOREIGN PATENT DOCUMENTS

| | | |
|---|---|---|
| JP | A-2003-99897 | 4/2003 |
| JP | A-2005-106475 | 4/2005 |

(Continued)

OTHER PUBLICATIONS

Office Action issued in Japanese Patent Application No. 2012-209785 dated Feb. 12, 2014 (with translation).

(Continued)

*Primary Examiner* — Michael J Zanelli
(74) *Attorney, Agent, or Firm* — Oliff PLC

(57) ABSTRACT

A driving assist system includes a vehicle, a mobile terminal of a user who drives the vehicle, and a driving assist device. The vehicle includes an output device outputting vehicle condition information. The driving assist device provides driving assist content to the mobile terminal. The driving assist device includes a receiving unit that receives the vehicle condition information and a user identifier of the user, a storage unit that stores the vehicle condition information in association with the user identifier, and stores driving proficiency level determination information specifying a driving proficiency level according to the vehicle condition information and driving assist information specifying driving assist content according to the driving proficiency level, a driving proficiency level determining unit that determines a driving proficiency level of each user, and a driving assist content providing unit that provides driving assist content corresponding to a driving proficiency level to each user.

6 Claims, 14 Drawing Sheets

(51) Int. Cl.
   *B60W 30/18*   (2012.01)
   *B60W 50/00*   (2006.01)
(52) U.S. Cl.
   CPC ...... *B60W 2540/30* (2013.01); *B60W 2550/402* (2013.01)

(56) References Cited

U.S. PATENT DOCUMENTS

| | | | |
|---|---|---|---|
| 2009/0091439 A1* | 4/2009 | Sekiyama et al. | 340/459 |
| 2010/0023223 A1* | 1/2010 | Huang et al. | 701/44 |
| 2010/0055649 A1* | 3/2010 | Takahashi et al. | 434/66 |
| 2012/0215375 A1* | 8/2012 | Chang | 701/1 |
| 2013/0173136 A1* | 7/2013 | Kim et al. | 701/101 |
| 2014/0032062 A1* | 1/2014 | Baer et al. | 701/51 |
| 2014/0272811 A1* | 9/2014 | Palan | 434/66 |

FOREIGN PATENT DOCUMENTS

| | | |
|---|---|---|
| JP | A-2007-133672 | 5/2007 |
| JP | 2008-021204 A | 1/2008 |
| JP | A-2009-115717 | 5/2009 |
| JP | A-2009-230377 | 10/2009 |
| JP | A-2009-234508 | 10/2009 |
| JP | A-2009-237937 | 10/2009 |
| JP | 2010-250491 A | 11/2010 |
| JP | A-2012-94015 | 5/2012 |
| JP | A-2012-128655 | 7/2012 |

OTHER PUBLICATIONS

Oct. 31, 2014 Office Action issued in Japanese Application No. 2012-209785.

* cited by examiner

FIG.5

| SPOT | MOVING DIRECTION | OBD-BASED DATA ITEM | DRIVING PROFICIENCY LEVEL | | |
|---|---|---|---|---|---|
| | | | LEVEL 3 (IDEAL VALUE) | LEVEL 2 | LEVEL 1 |
| SPOT 01: (x1, y1) | DOWN | ENGINE SPEED | 1000<x<1500 | x≤1000 | 1500≤x |
| | | VEHICLE SPEED | 20<x<30 | x≤20 | 30≤x |
| | | ADVANCE ANGLE | 10°<x<15° | x≤10° | 15°≤x |
| | | BRAKE | 5<x<6 | 6≤x | x≤4 |
| | | ... | ... | ... | ... |
| SPOT 02: (x2, y2) | UP AND DOWN | ENGINE SPEED | 1500<x<2000 | x≤1500 | 2000≤x |
| | | VEHICLE SPEED | 30<x<40 | x≤30 | 40≤x |
| | | ADVANCE ANGLE | - | - | - |
| | | BRAKE | - | - | - |
| | | ... | ... | ... | ... |

FIG.6A

| SPOT | MOVING DIRECTION | OBD-BASED DATA ITEM | DRIVING PROFICIENCY LEVEL | NOTIFICATION CONTENT | ASSISTANCE |
|---|---|---|---|---|---|
| SPOT 01: (x1, y1) | DOWN | ENGINE SPEED | LEVEL 3 | - | - |
| | | | LEVEL 2 | | SPEED OF 20 TO 30 km IS MAINTAINED WHEN ENGINE SPEED IS ADJUSTED TO 1000 TO 1500. |
| | | | LEVEL 1 | | SPEED OF 20 TO 30 km IS MAINTAINED WHEN ENGINE SPEED IS ADJUSTED TO 1000 TO 1500. |
| | | VEHICLE SPEED | LEVEL 3 | - | - |
| | | | LEVEL 2 | THERE IS DOWNHILL CURVE. PLEASE TRAVEL AT SPEED OF 20 TO 30 km. | - |
| | | | LEVEL 1 | SPEED IS LIKELY TO INCREASE AT DOWNHILL CURVE. IT IS DANGEROUS, SO PLEASE REDUCE SPEED TO 20 TO 30 km AND THEN TRAVEL. | - |
| | | ADVANCE ANGLE | LEVEL 3 | - | - |
| | | | LEVEL 2 | - | PLEASE TURN HANDLE AT 10° TO 15°. |
| | | | LEVEL 1 | - | PLEASE TURN HANDLE AT 10° TO 15°. |
| | | BRAKE | LEVEL 3 | - | - |
| | | | LEVEL 2 | PLEASE TRAVEL USING BRAKE FREQUENTLY. | PLEASE STEP ON BRAKE HALF BEFORE CURVE. |
| | | | LEVEL 1 | PLEASE TRAVEL USING BRAKE SUFFICIENTLY. | PLEASE STEP ON BRAKE HALF BEFORE CURVE. |

FIG.6B

| SPOT | MOVING DIRECTION | OBD-BASED DATA ITEM | DRIVING PROFICIEN-CY LEVEL | NOTIFICATION CONTENT | ASSISTANCE |
|---|---|---|---|---|---|
| SPOT 02: (x2, y2) | UP AND DOWN | ENGINE SPEED | LEVEL 3 | - | - |
| | | | LEVEL 2 | | SPEED OF 30 TO 40 km IS MAINTAINED WHEN ENGINE SPEED IS ADJUSTED TO 1500 TO 2000. |
| | | | LEVEL 1 | | SPEED OF 30 TO 40 km IS MAINTAINED WHEN ENGINE SPEED IS ADJUSTED TO 1500 TO 2000. |
| | | VEHICLE SPEED | LEVEL 3 | - | - |
| | | | LEVEL 2 | HERE IS ZONE WHERE SLIP FREQUENTLY OCCURS. PLEASE TRAVEL AT SPEED OF 30 TO 40 km. | |
| | | | LEVEL 1 | HERE IS ZONE WHERE SLIP FREQUENTLY OCCURS. PLEASE REDUCE SPEED TO 30 TO 40 km AND THEN TRAVEL. | |
| | | ADVANCE ANGLE | LEVEL 3 | - | - |
| | | | LEVEL 2 | - | - |
| | | | LEVEL 1 | - | - |
| | | BRAKE | LEVEL 3 | - | - |
| | | | LEVEL 2 | - | - |
| | | | LEVEL 1 | - | - |

FIG.7

| OBD-BASED DATA ITEM | OBD-BASED DATA VALUE |
|---|---|
| ENGINE SPEED | 2000 |
| VEHICLE SPEED | 42 |
| DRIVING TIME (ACCUMULATED TOTAL) | 1100:34 |
| TRAVEL DISTANCE (ACCUMULATED TOTAL) | 30001 |
| TRAVEL HISTORY (POSITIONAL INFORMATION) | (x1, y1) |
| ADVANCE ANGLE | 0 |
| BRAKE | 0 |
| ⋮ | ⋮ |

FIG.8

USER ID: user001

| DATE | TIME | ENGINE SPEED | VEHICLE SPEED | DRIVING TIME (ACCUMULATED TOTAL) | TRAVEL DISTANCE (ACCUMULATED TOTAL) | TRAVEL HISTORY (POSITIONAL INFORMATION) | MOVING DIRECTION | ADVANCE ANGLE | BRAKE | ... |
|---|---|---|---|---|---|---|---|---|---|---|
| 2012/8/6 | 8:00 | 1200 | 0 | 1100:32 | 30000 | (x0, y0) | - | 0 | 0 | ... |
| 2012/8/6 | 8:01 | 1200 | 0 | 1100:33 | 30000 | (x0, y0) | - | 0 | 10 | ... |
| 2012/8/6 | 8:02 | 2000 | 42 | 1100:34 | 30001 | (x1, y1) | DOWN | 11 | 0 | ... |
| 2012/8/6 | 8:03 | 2000 | 49 | 1100:35 | 30002 | (x2, y2) | DOWN | 2 | 0 | ... |
| 2012/8/6 | 8:04 | 3000 | 63 | 1100:36 | 30004 | (x3, y3) | DOWN | 1 | 1 | ... |
| 2012/8/6 | 8:05 | 3000 | 62 | 1100:37 | 30006 | (x4, y4) | DOWN | 0 | 0 | ... |
| ... | ... | ... | ... | ... | ... | ... | ... | ... | ... | ... |

FIG.9

USER ID: user001

| SPOT | MOVING DIRECTION | DRIVING PROFICIENCY LEVEL | | | |
|---|---|---|---|---|---|
| | | ENGINE SPEED | VEHICLE SPEED | ADVANCE ANGLE | BRAKE |
| SPOT 01: (x1, y1) | DOWN | LEVEL 1 | LEVEL 1 | LEVEL 3 | LEVEL 1 |
| SPOT 02: (x2, y2) | UP AND DOWN | LEVEL 1 | LEVEL 1 | - | - |
| ⋮ | ⋮ | ⋮ | ⋮ | ⋮ | ⋮ |

# DRIVING ASSIST SYSTEM, DRIVING ASSIST DEVICE, AND DRIVING ASSIST METHOD

CROSS-REFERENCE TO RELATED APPLICATIONS

The present application claims priority to and incorporates by reference the entire contents of Japanese Patent Application No. 2012-209785 filed in Japan on Sep. 24, 2012.

BACKGROUND OF THE INVENTION

1. Field of the Invention

The present invention relates to a technology for driving assist.

2. Description of the Related Art

Navigation devices or driving assist devices that provide route guidance or driving assist according to a driver's driving skill or driving proficiency level have been known.

For example, a navigation device that provides guidance according to a driver's driving skill at a junction is described in Japanese Laid-open Patent Publication No. 2009-115717. Specifically, a navigation device is mounted in a moving vehicle and includes a storage unit, a deciding unit, and a presenting unit. The storage unit stores a degree representing a driver's driving skill and a degree representing difficulty merging at a junction. When the moving vehicle is at a predetermined distance before a junction, the deciding unit decides guidance content for the junction based on a proficiency level and a degree of difficulty of merging stored in the storage unit. The presenting unit presents the guidance content.

Further, a driving assist device capable of providing more appropriate driving assist at the time of merging according to a driver's characteristic is described in Japanese Laid-open Patent Publication No. 2007-133672. Specifically, the driving assist device acquires terrain information of an acceleration lane, a vehicle state quantity, environmental information, and a driver's driving characteristic information, and estimates a merging start position and an arrival time based on the acquired information. Furthermore, a vehicle speed when an own vehicle reaches the merging start position and a current position of a vehicle on a main lane which is expected to reach the merging start position at the same time as the own vehicle are obtained), a situation of a neighboring vehicle is detected, it is determined whether the neighboring vehicle is at such a position that the neighboring vehicle is expected to affect traveling of the own vehicle when reaching the merging start position, and appropriate warning or operational support is given when it is determined that the neighboring vehicle is at such position.

Further, a navigation device capable of performing a route search in which a driver's current proficiency level is accurately reflected is described in Japanese Laid-open Patent Publication No. 2005-106475. Specifically, the navigation device includes a search condition designating unit that designates a route of a search target, a map information storage unit that stores road map information of a search target, a searching unit that searches for a route reaching the destination under the condition designated as the search condition based on the road map information, and displays the searched route thereon, and a proficiency level information storage unit that stores proficiency level information related to a driver's driving skill, wherein the searching unit searches for a route of a driving condition that satisfies the designated condition and corresponds to the driver's proficiency level based on the condition designated by the search condition designating unit and the driver's proficiency level information stored in the proficiency level storage unit.

However, in the navigation devices and the driving assist device disclosed in the above-mentioned documents, in the case of vehicles shared and used by a plurality of drivers such as rental cars or company cars, there is a problem in that it is difficult to provide route guidance or driving assist according to the driver's driving skill or driving proficiency level.

In the case of company cars, unlike rental cars used by a large indefinite number of drivers, drivers (for example, employees of a company) are predictable to some extent. Hence, if a certain operation is performed to identify the driver every time the driving starts, it is possible to identify the driver. Then, route guidance or driving assist corresponding to the identified driver's driving skill or driving proficiency level may be realized. However, in this case, the operation to identify the driver must be performed at least every time the driving starts and the operation may take time and can be inconvenient.

SUMMARY OF THE INVENTION

According to one aspect of an embodiment, a driving assist system includes: a vehicle that includes an output device outputting vehicle condition information; a mobile terminal of a user who drives the vehicle; and a driving assist device that provides driving assist content to the mobile terminal. The driving assist device includes a receiving unit that receives the vehicle condition information of the vehicle and a user identifier of the user who drives the vehicle, a storage unit that stores the vehicle condition information received by the receiving unit in association with the user identifier, and stores driving proficiency level determination information specifying a driving proficiency level according to the vehicle condition information and driving assist information specifying driving assist content according to the driving proficiency level, a driving proficiency level determining unit that determines a driving proficiency level of each user based on the vehicle condition information and the driving proficiency level determination information stored in the storage unit, and a driving assist content providing unit that provides driving assist content corresponding to a driving proficiency level to each user based on the driving proficiency level determined by the driving proficiency level determining unit and the driving assist information stored in the storage unit.

According to another aspect of an embodiment, a driving assist method performed by a driving assist device in a driving assist system including a vehicle that includes an output device outputting vehicle condition information, a mobile terminal of a user who drives the vehicle, and the driving assist device that provides driving assist content to the mobile terminal, the driving assist method includes: receiving the vehicle condition information of the vehicle and the user identifier of a user who drives the vehicle; storing the vehicle condition information and the user identifier which are received in the receiving of the vehicle condition information in a storage unit in association with each other; reading the vehicle condition information, driving proficiency level determination information specifying a driving proficiency level according to the vehicle condition information, and driving assist information specifying driving assist content according to the driving proficiency level from the storage unit; determining a driving proficiency level of each user based on the vehicle condition information and the driving proficiency level determination information; providing the driving assist content according to the driving proficiency level to each user based on the driving proficiency level determined in the determining of the driving proficiency level and the driving assist information.

According to still another aspect of an embodiment, a non-transitory computer-readable storage medium with an executable program stored thereon, the program causing a computer, which is a driving assist device that provides driving assist content to a mobile terminal of a user who drives a vehicle including an output device outputting vehicle condition information, to function as: a receiving unit that receives the vehicle condition information of the vehicle and the user identifier of a user who drives the vehicle; a storage unit that stores the vehicle condition information received by the receiving unit in association with the user identifier, and stores driving proficiency level determination information specifying a driving proficiency level according to the vehicle condition information and driving assist information specifying driving assist content according to the driving proficiency level; a driving proficiency level determining unit that determines a driving proficiency level of each user based on the vehicle condition information and the driving proficiency level determination information; and a driving assist content providing unit that provides driving assist content corresponding to a driving proficiency level to each user based on the driving proficiency level determined by the driving proficiency level determining unit and the driving assist information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a driving proficiency level determination table 122;

FIGS. 6A and 6B are diagrams illustrating an example of a driving assist information table 123;

FIG. 7 is a diagram illustrating an example of OBD-based data;

FIG. 8 is a diagram illustrating an example of an OBD-based data history;

FIG. 9 is a diagram illustrating an example of driving proficiency level information 125;

DETAILED DESCRIPTION OF THE PREFERRED EMBODIMENTS

Hereinafter, preferred embodiments of the present invention will be described.

Configuration

System Configuration

Figure 1:
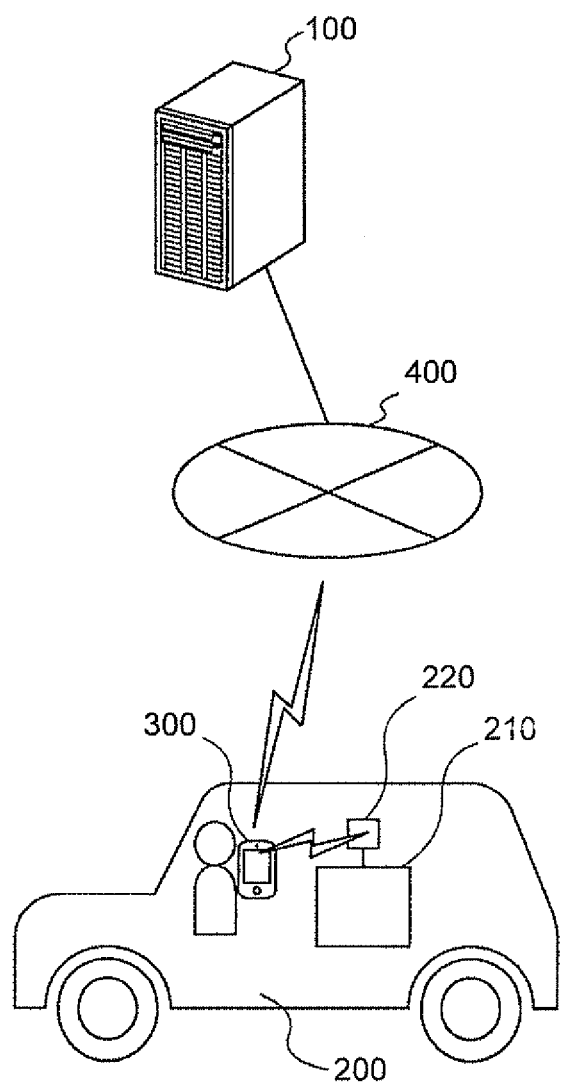
FIG. 1 is a diagram illustrating an exemplary configuration of a system.

FIG. 1 is a diagram illustrating an exemplary configuration of a system according to an embodiment of the present invention. The system according to the present embodiment includes a driving assist server 100, a vehicle 200, a mobile terminal 300, and a network 400.

The driving assist server 100 is a server that provides personalized driving assist content to each driver. The driving assist server 100 acquires on-board diagnostics (OBD) data of the vehicle 200 through the mobile terminal 300 of the driver (the user), and manages the OBD-based data according to each driver. The driving assist server 100 determines a driving proficiency level of each driver based on the OBD-based data, and provides driving assist content to the mobile terminal 300 based on the driving proficiency level. This point will be described later in detail.

The vehicle 200 is a vehicle having an OBD. Examples of the vehicle 200 include gasoline vehicles, electric cars, hybrid cars, and other fuel-driven vehicles. The OBD stands for on-board diagnostics and refers to an OBD system that acquires OBD-based data from various kinds of sensors in real time and manages a condition of vehicles. For example, when the OBD diagnoses a certain position as a failure, for example, the OBD turns on a lamp indicating the failure in a driver seat panel to inform a driver of the failure, and records the OBD-based data indicating failure content. A mechanic reads the OBD-based data using a dedicated device and can easily specify a failure position.

The vehicle 200 according to the present embodiment includes an ECU 210 and an OBD reader 220 as illustrated in FIG. 1.

The ECU 210 stands for engine control unit, and is a control computer that electronically controls the whole vehicle and in-vehicle devices. The ECU 210 has a function of the OBD, and detects a condition of each of the in-vehicle devices. Specifically, for example, the ECU 210 detects various kinds of vehicle condition information such as an engine speed, a vehicle speed, a driving time, a travel distance, a travel history (positional information), a throttle opening, an advance angle, an intake temperature, a voltage, fuel information, a $CO_2$ emission, a brake, a door, a lamp, a gear, a light (exterior light), a courtesy (interior light), and a blinker as the OBD-based data. The ECU 210 further has a function of performing failure diagnosis based on the vehicle condition information.

The OBD reader 220 has an interface function between the ECU 210 and the outside. In the present embodiment, since the ECU 210 provides the OBD-based data to the mobile terminal 300, the OBD reader 220 has a communication function (for example, WiFi (a registered trademark)) of performing communication with the mobile terminal 300. Besides communication, the OBD reader 220 may employ a connector of connecting with the mobile terminal 300 directly through a cable.

The mobile terminal 300 is a mobile terminal of a driver. For example, the mobile terminal 300 is implemented by a smart phone, a mobile telephone, a PDA, or the like. The driver performs communication with the ECU 210 through the OBD reader 220 during the ride in the vehicle 200 and thoroughly acquires the OBD-based data indicating a vehicle condition of the vehicle 200. Further, the acquired OBD-based data is transmitted to the driving assist server 100 during or after traveling.

The network 400 is a communication network in which the driving assist server 100 and the mobile terminal 300 are connected with each other. For example, the network 400 includes various kinds of networks such as the 3G network, the Internet, and a dedicated line.

Software Configuration

Figure 2:
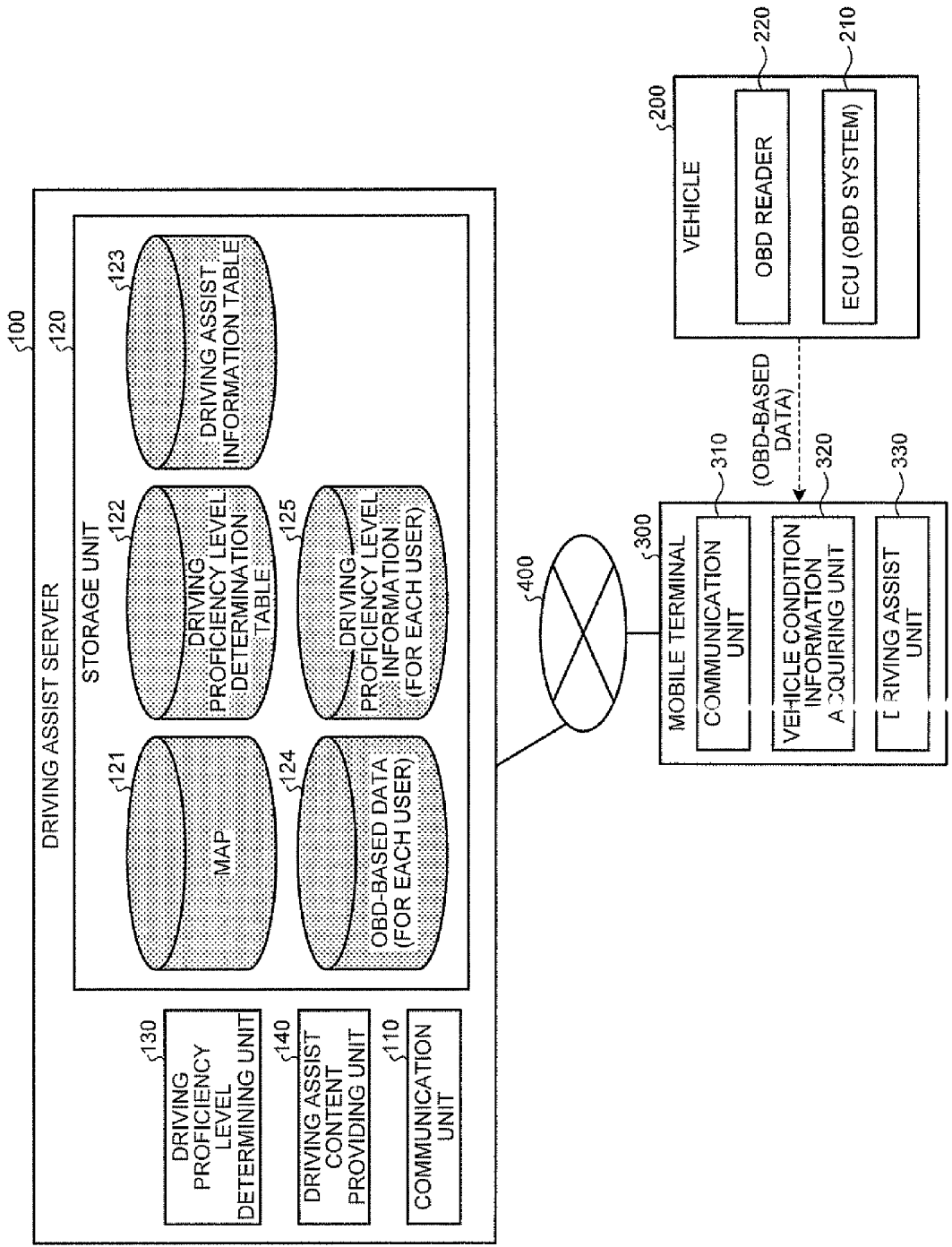
FIG. 2 is a diagram illustrating an exemplary software configuration of a system.

FIG. 2 is a diagram illustrating an exemplary software configuration of a system according to an embodiment of the present invention.

The driving assist server 100 includes a communication unit 110, a storage unit 120, a driving proficiency level determining unit 130, and a driving assist content providing unit 140 as functional parts.

The communication unit 110 has a function of performing transmission and reception of data with an external device.

The storage unit 120 has a function of storing a map 121, a driving proficiency level determination table 122, a driving assist information table 123, OBD-based data 124, driving proficiency level information 125, and the like. The details of the above information will be described below with a concrete example.

The driving proficiency level determining unit 130 has a function of determining a driving proficiency level of each user based on history of the OBD-based data 124 and the driving proficiency level determination table 122.

The driving assist content providing unit 140 has a function of providing driving assist content corresponding to a driving proficiency level according to each user based on the driving proficiency level determined by the driving proficiency level determining unit 130 and the driving assist information table 123. The driving assist content is transmitted to the mobile terminal 300.

The mobile terminal 300 includes a communication unit 310, a vehicle condition information acquiring unit 320, and a driving assist unit 330 as functional parts.

The communication unit 310 has a function of performing transmission and reception of data with an external device.

The vehicle condition information acquiring unit 320 has a function of thoroughly acquiring the OBD-based data indicating the vehicle condition of the vehicle 200 from the ECU 210 through the OBD reader 220 while the driver is riding in the vehicle 200. Further, the acquired OBD-based data is transmitted to the driving assist server 100 together with a user identifier (for example, a user ID) of the user driving the vehicle through the communication unit 310 during or after traveling.

The driving assist unit 330 has a function of providing driving assist based on the driving assist content received from the driving assist server 100.

The functional parts are implemented by a computer program which is executed on hardware resources such as a central processing unit (CPU), a read only memory (ROM), and a random access memory (RAM) of a computer configuring each device. Here, the functional parts may be read as "means," "module," "unit," or "circuit."

Further, the functional parts need not be necessarily arranged on a single computer and may be arranged in a distributed form as necessary.

Further, the storage unit 120 systematically holds predetermined data on a storage medium such as a hard disk drive (HDD) in a computer configuring the driving assist server 100. The storage unit 120 needs not be necessarily arranged in the driving assist server 100 and may be arranged in another device.

Hardware Configuration

Figure 3:
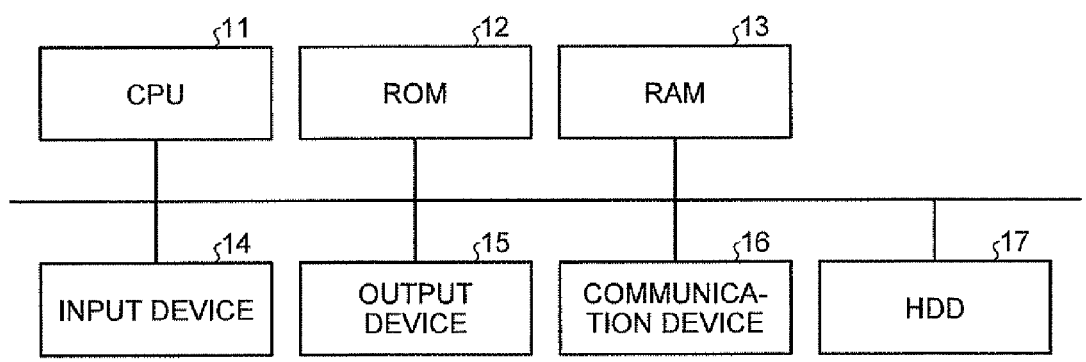
FIG. 3 is a diagram illustrating an exemplary hardware configuration of a driving assist server 100 and a mobile terminal 300.

FIG. 3 is a diagram illustrating an exemplary hardware configuration of the driving assist server 100 and the mobile terminal 300 according to an embodiment of the present invention. Specifically, the hardware configuration is similar to a configuration of a general personal computer, a general workstation, or the like, and includes a CPU 11, a ROM 12, a RAM 13, an input device 14, an output device 15, a communication device 16, and a HDD 17 as illustrated in FIG. 3.

The CPU 11 executes various kinds of programs and performs arithmetic processing. The ROM 12 stores a program and the like necessary at the time of activation. The RAM 13 temporarily stores a process performed by the CPU 11 and stores data. The input device 14 includes a keyboard or a mouse. The output device 15 includes a display. The communication device 16 performs communication with another device through the network 400. The HDD 17 stores various kinds of data and programs.

Example of Map

Figure 4:
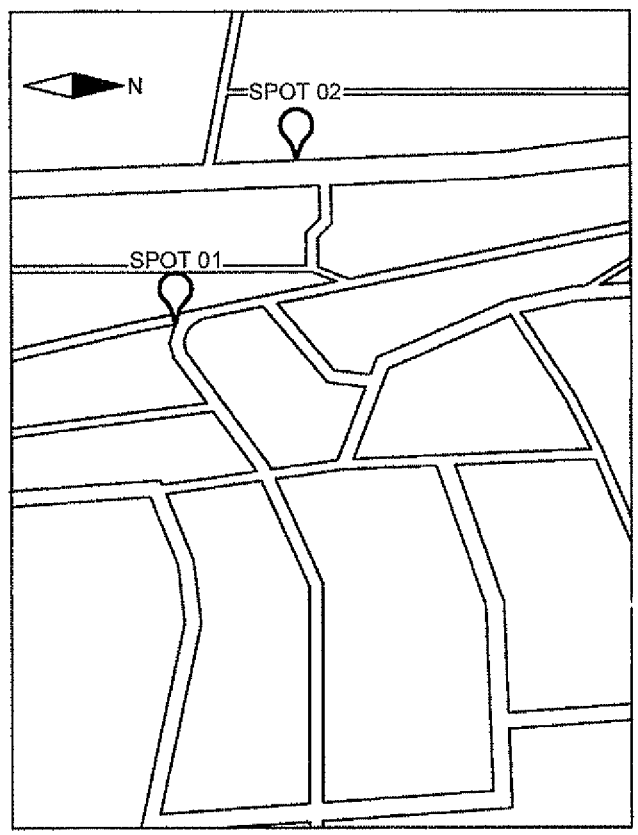
FIG. 4 is a diagram illustrating an example of a map 121.

FIG. 4 is a diagram illustrating an example of the map 121 according to the present embodiment. Specifically, the map 121 is map data for navigation to be provided to the mobile terminal 300 as illustrated in FIG. 4. The map 121 includes information of point spots (which are referred to as caution spots) of which the driver has to be cautioned during driving. Examples of the caution spots include a sharp curve, a slip caution spot, and a lane width reduced spot, and point spots of which the driver has to be cautioned during driving are registered in advance as the caution spots.

The driving assist server 100 acquires the driver's OBD-based data corresponding to the caution spot, and provides the driver with driving assist content according to the driving proficiency level at the caution spot during traveling.

Driving Proficiency Level Determination Table

FIG. 5 is a diagram illustrating an example of the driving proficiency level determination table 122 according to the present embodiment. The driving proficiency level determination table 122 is information used to determine a level indicating the driving proficiency level according to the OBD-based data indicating the vehicle condition information. Specifically, "spot," "moving direction," "OBD-based data item," and "driving proficiency level" are associated with one another as illustrated in FIG. 5.

The "spot" corresponds to a caution spot on the map 121, and is expressed, for example, by coordinate information. In the driving proficiency level determination table 122, a level indicating a driving proficiency level is specified for each "spot," and thus a level can be determined based on the OBD-based data for each spot.

The "moving direction" represents a moving direction of the vehicle 200. For example, when a road has a slope, a lane is an uphill lane when viewed from a vehicle moving from one side, and a lane is a downhill lane when viewed from a vehicle moving from the other side. The caution point is different depending on whether the lane is viewed as the uphill lane or the downhill lane and driving assist content to be provided differs. For this reason, in the driving proficiency level determination table 122, a level indicating a driving proficiency level is specified for each "moving direction," and thus a level can be determined based on the OBD-based data for each moving direction.

As an index representing a moving direction, expressions such as "up" and "down" may be used to indicate a direction towards Tokyo and a direction away from Tokyo. Alternatively, expression such as "eastward," "westward," "southward," and "northward" may be used.

The "OBD-based data item" represents an item of the OBD-based data. An "engine speed," a "vehicle speed," an "advance angle," a "brake," and the like illustrated in FIG. 5 are data included in the OBD-based data.

The "driving proficiency level" is a driving proficiency level (level) specified according to a value of the "OBD-based data item". For example, in the driving proficiency level determination table 122 illustrated in FIG. 5, an ideal value of the "engine speed" of the vehicle during driving is 1000 to 1500 rpm in a down lane of a spot 01. In this regard, when an actual value (for example, an average value when there are a plurality of histories) of an OBD-based data value of the "engine speed" of the vehicle actually driven by the user on the down lane of the spot 01 is 1200, the "driving proficiency level" of the user in the down lane of the spot 01 is determined as a level 3.

Meanwhile, when the actual value is greater than or less than the ideal value of the "engine speed," the "driving proficiency level" of the user in the down lane of the spot 01 is determined as a level 2 or a level 1.

Driving Assist Information Table

FIGS. 6A and 6B are diagrams illustrating an example of the driving assist information table 123 according to the present embodiment. The driving assist information table 123 is information of driving assist content provided according to a driving proficiency level. Specifically, "spot," "moving direction," "OBD-based data item," "driving proficiency level," "notification content," and "assistance" are associated with one another as illustrated in FIGS. 6A and 6B.

The "spot" corresponds to the caution spot on the map 121. In the driving assist information table 123, driving assist content is specified according to a driving proficiency level for each "spot," and thus driving assist content corresponding to a driving proficiency level can be provided for each spot.

The "moving direction" represents a moving direction of the vehicle 200. In the driving assist information table 123, driving assist content is specified according to a driving proficiency level for each "moving direction," and thus driving assist content corresponding to a driving proficiency level can be provided for each moving direction.

The "OBD-based data item" represents an item of the OBD-based data.

The "driving proficiency level" represents a driving proficiency level (level) specified according to a value of the "OBD-based data item" as described above. In the driving assist information table 123, driving assist content (for example, "notification content" and "assistance") to be provided is decided according to the "driving proficiency level" (level) determined based on the driving proficiency level determination table 122.

The "notification content" is driving assist content which the user is notified of through a display, a sound, or the like and which is provided according to the "driving proficiency level" (level). For example, "notification content" provided to the user with the "vehicle speed" at the "driving proficiency level" of the level 2 in the down lane of the spot 01 is "There is downhill curve. Please travel at speed of 20 to 30 km."

The "assistance" is driving assist content which the user is notified of through a display, a sound, or the like and which is provided according to the "driving proficiency level" (level). The "notification content" is information to call for attention during driving, whereas the "assistance" is assistance information related to an improvement in driving skill for realizing ideal driving and traveling. For example, "assistance" provided to the user with the "engine speed" at the "driving proficiency level" of the level 2 in the down lane of the spot 01 is "speed of 20 to 30 km is maintained when engine speed is adjusted to 1000 to 1500."

In the driving assist information table 123, there are portions expressed by "-" in "notification content" and "assistance." This indicates that there is no particular information to provide to the user to give notification and assistance. For example, "notification content" and "assistance" provided to the user with the "engine speed" at the "driving proficiency level" of the level 3 are expressed by "-." It is because there is no particular information to provide, as notification and assistance, to the user having the high driving proficiency level of the level 3.

Example of OBD-Based Data

FIG. 7 is a diagram illustrating an example of OBD-based data according to the present embodiment. The OBD-based data 124 includes items such as an "OBD-based data item" and an "OBD-based data value."

The "OBD-based data item" represents a name of OBD-based data specified in an OBD system. The "OBD-based data value" is a specific data value corresponding to the "OBD-based data item."

Specifically, examples of the OBD-based data include an engine speed, a vehicle speed, a driving time (accumulated total), a travel distance (accumulated total), a travel history (positional information), and an advance angle.

The information is provided through the function of the OBD system of the ECU 210, and, in the present embodiment, output to the mobile terminal 300 through the OBD reader 220 at predetermined time intervals while the driver is riding in the vehicle as described above. Further, the information is transmitted from the mobile terminal 300 to the driving assist server 100.

Example of OBD-Based Data History

FIG. 8 is a diagram illustrating an OBD-based data history according to the present embodiment. The OBD-based data of the OBD system of the ECU 210 is transmitted to the driving assist server 100 through the mobile terminal 300 of the user together with the user ID, and accumulated in the storage unit 120 for each user as history of the OBD-based data 124 (which is referred to as an "OBD-based data history"). Thus, the OBD-based data history includes items such as "date," "time," and OBD-based data value of each "OBD-based data item" as illustrated in FIG. 8. "Date" and "time" represent a date and a time at which the OBD-based data is acquired in the ECU 210, respectively.

For example, referring to the OBD-based data history of FIG. 8, it is understood that the OBD-based data was received and accumulated from a start time of 8:00, Aug. 6, 2012. Thereafter, for example, the OBD-based data is received at intervals of one minute, and thus it is possible to understand the vehicle condition of the vehicle 200 in time series with reference to the OBD-based data history.

Further, the OBD-based data history of FIG. 8 is assumed to be the OBD-based data history of the user (the user ID: user001) having the mobile terminal 300. The driving assist server 100 identifies the OBD-based data history of each user, for example, using the user ID in order to manage the OBD-based data histories of a plurality of users. For example, the mobile terminal 300 performs a login operation and the like using the user ID when performing communication with the driving assist server 100.

Driving Proficiency Level Information

FIG. 9 is a diagram illustrating an example of the driving proficiency level information 125 according to the present embodiment. The driving proficiency level information 125 is a driving proficiency level (level) of each user determined based on the OBD-based data history of the user (for example, user01) and the driving proficiency level determination table 122. Specifically, "spot," "moving direction," and "driving proficiency level" of each "OBD-based data item" are associated with one another as illustrated in FIG. 9.

The "spot" corresponds to the caution spot on the map 121. In the driving proficiency level information 125, a driving proficiency level is held for each "spot."

The "moving direction" represents a moving direction of the vehicle 200. In the driving proficiency level information 125, a driving proficiency level is held for each "moving direction."

The "driving proficiency level" is a driving proficiency level (level) of each user. Further, in the driving proficiency level information 125, as illustrated in FIG. 9, a driving proficiency level is held for each "OBD-based data item" (for example, an "engine speed," a "vehicle speed," an "advance angle," and a "brake").

Further, the driving proficiency level information 125 is information which is a driving proficiency level (level) of each user determined based on the OBD-based data history of the user and the driving proficiency level determination table 122 and thus held for each user.

Operation

Next, a processing operation of the system according to the present embodiment will be described. The process is divided into two processes of (a first process) and (a second process), and the description will proceed with the two processes.

First Process

Figure 10:
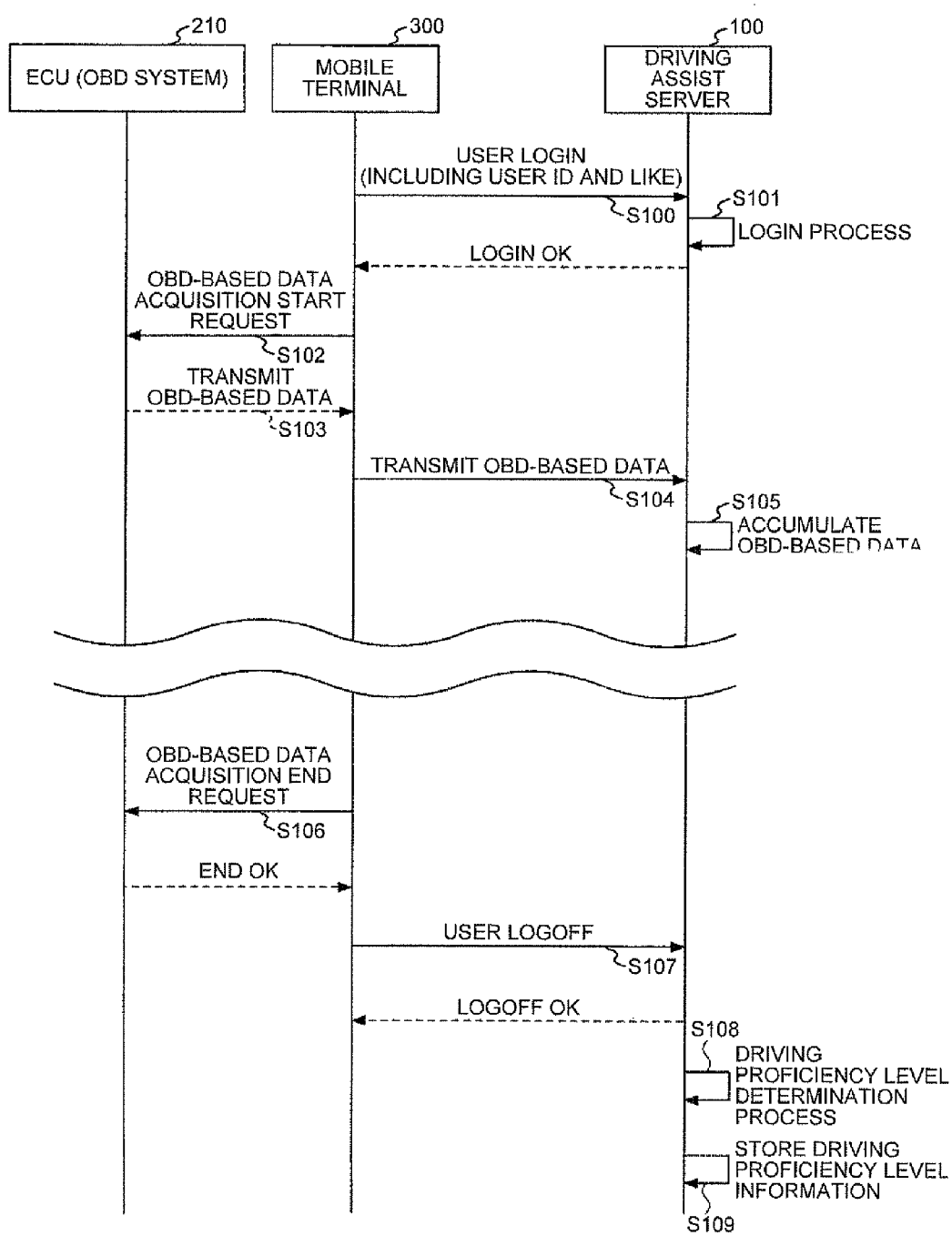
FIG. 10 is a sequence diagram illustrating an exemplary process (first process) of a system.

FIG. 10 is a sequence diagram illustrating an exemplary process (first process) of the system according to the present embodiment. In the first process, an OBD-based data accumulation process and a driving proficiency level determination process will be described. Since the driving assist can be implemented through accumulation of the OBD-based data of the users, it is necessary to accumulate at least a minimum amount of OBD-based data before providing driving assist. Then, after a certain amount of OBD-based data is accumulated, accumulation of OBD-based data is performed while driving assist is provided during driving.

First of all, when the user gets in the vehicle 200 to start driving, the user accesses the driving assist server 100 and performs a user login operation using the mobile terminal 300 (step S100). The mobile terminal 300 includes a dedicated application that is installed in advance and used to access the driving assist server 100, and can receive an input of the user ID and then perform the user login operation through the dedicated application. Alternatively, the user login operation may be executed through a general-purpose web browser or the like.

Upon receiving the user login request, the driving assist server 100 executes the login process based on the user ID (step S101). When the received user ID is the one registered in advance, login is allowed.

Next, the user transmits an OBD-based data acquisition start request to the ECU 210 (including the OBD system) through the OBD reader 220 using the communication function (for example, WiFi) of the mobile terminal 300 (step S102). As described above, the mobile terminal 300 can make the OBD-based data acquisition start request through a dedicated application, a general-purpose tool, or the like used to access the driving assist server 100.

Further, step S100 and step S102 may be executed at the same time. In other words, the OBD-based data acquisition start request may be made at the same time as a timing at which the user login operation is performed using the mobile terminal 300.

The ECU 210 transmits the OBD-based data to the mobile terminal 300 through the OBD reader 220 (step S103). A specific example of the OBD-based data is illustrated in FIG. 7.

Upon receiving the OBD-based data, the mobile terminal 300 (the vehicle condition information acquiring unit 320) transmits the received OBD-based data to the driving assist server 100 (step S104). A specific example of the OBD-based data is illustrated in FIG. 7.

Further, when the OBD reader 220 is in an environment in which communication with the network 400 can be performed, the ECU 210 may transmit the OBD-based data directly to the driving assist server 100 through the OBD reader 220 without the relay of the mobile terminal 300.

Further, for example, the mobile terminal 300 according to the present embodiment can be implemented by a smart phone, a mobile telephone, a PDA, or the like as described above. For this reason, when the mobile terminal 300 includes a GPS sensor, the mobile terminal 300 may check whether positional information obtained by the GPS sensor matches the "travel history (positional information)" of the OBD-based data, replace the "travel history (positional information)" of the OBD-based data with the positional information obtained by the GPS sensor when an error is large, and then transmit the OBD-based data to the driving assist server 100. Through this operation, the accuracy of the OBD-based data is improved.

Upon receiving the OBD-based data, the driving assist server 100 causes the received OBD-based data to be accumulated in the storage unit 120 in association with each user ID (step S105). A specific example of the OBD-based data is illustrated in FIG. 8.

Thereafter, steps S103 to S105 are repeatedly performed. In other words, the ECU 210 continuously transmits the OBD-based data during the ride (until an OBD-based data acquisition end request is received). Further, since the mobile terminal 300 also continuously transmits the received OBD-based data to the driving assist server 100, detailed OBD-based data is continuously accumulated in the storage unit 120 of the driving assist server 100 during the ride.

Thereafter, when driving of the vehicle 200 ends, for example, just before getting off the vehicle, the user transmits the OBD-based data acquisition end request to the ECU 210 (including the OBD system) through the OBD reader 220 using the communication function (for example, WiFi) of the mobile terminal 300 (step S106). Upon receiving the OBD-based data acquisition end request, the ECU 210 ends transmission of the OBD-based data.

Further, instead of making the OBD-based data acquisition end request, for example, an operation of stopping the engine of the vehicle 200 may be performed. It is because the ECU 210 is also stopped by this operation.

Further, the user accesses the driving assist server 100 and performs the user logoff operation using the mobile terminal 300 (step S107). Upon receiving the user logoff request, the driving assist server 100 ends reception and accumulation of the OBD-based data.

Further, the user logoff operation may be omitted. For example, the driving assist server 100 may regard that the user logoff operation has been performed when the OBD-based data has not been received from the mobile terminal 300 of the same user for a predetermined period of time.

As described above, the user transmits the OBD-based data to the driving assist server 100 through the mobile terminal 300 when driving the vehicle 200. Thus, the OBD-based data history 124 related to the vehicle 200 of the same user is accumulated in the driving assist server 100.

Next, upon receiving the user logoff request, the driving assist server 100 (the driving proficiency level determining unit 130) executes the driving proficiency level determination process based on the OBD-based data history of the user ID (step S108).

The driving assist server 100 (the driving proficiency level determining unit 130) stores the driving proficiency level determined by the driving proficiency level determination process as the driving proficiency level information (step S109).

Figure 11:
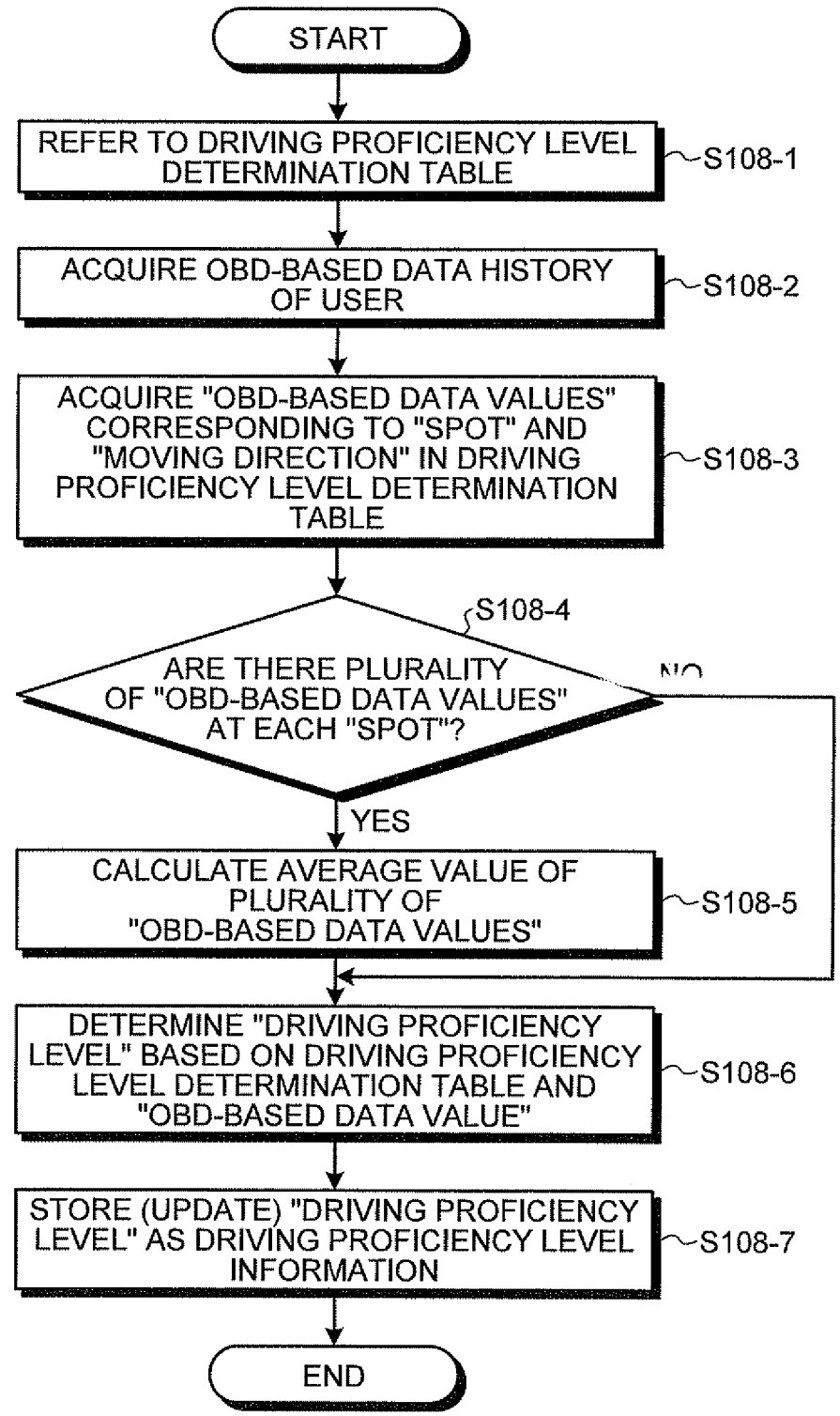
FIG. 11 is a flowchart illustrating a driving proficiency level determination process.

FIG. 11 is a flowchart illustrating the driving proficiency level determination process according to the present embodiment.

The driving proficiency level determining unit 130 refers to the driving proficiency level determination table (step S108-1). As described above, the driving proficiency level determination table is stored in the storage unit 120.

The driving proficiency level determining unit 130 acquires the OBD-based data history of the user (step S108-2). Here, the OBD-based data history whose user ID is user01 is acquired (for example, see FIG. 8).

The driving proficiency level determining unit 130 acquires the "OBD-based data values" corresponding to "spot" and "moving direction" in the driving proficiency level determination table (step S108-3). Specifically, the following description will be made with reference to FIGS. 5 and 8.

Referring to the driving proficiency level determination table of FIG. 5, a spot 01 (x1, y1)/down and a spot 02 (x2, y2)/up and down are specified as "spot" and "moving direction" used to determine the driving proficiency level. Thus, in this case, an OBD-based data values acquired in the spot 01 (x1, y1)/down and the spot 02 (x2, y2)/up and down are acquired from the OBD-based data history of the user whose user ID is user01 using the "travel history (positional information)" as a key.

Here, the following OBD-based data can be acquired with reference to the OBD-based data history of user01 of FIG. 8.

<OBD-based data 1>
"date": 2012/8/6
"time": 8:02
"engine speed": 2000
"vehicle speed": 42
"driving time (accumulated total)": 1100:34
"travel distance (accumulated total)": 30001
"travel history (positional information)": (x1, y1)
"moving direction": down
"advance angle": 11
"brake": 0
<OBD-based data 2>
"date": 2012/8/6
"time": 8:03
"engine speed": 2000
"vehicle speed": 49
"driving time (accumulated total)": 1100:35
"travel distance (accumulated total)": 30002
"travel history (positional information)": (x2, y2)
"moving direction": down
"advance angle": 2
"brake": 0

Next, the driving proficiency level determining unit 130 determines whether there are a plurality of "OBD-based data values" at each "spot" (step S108-4). The OBD-based data history is made such that OBD-based data is cumulatively accumulated each time the user drives the vehicle. Thus, for example, accumulated "dates" and times" are different, but when driving is performed at the same "spot," there may be a plurality of pieces of OBD-based data for the same "spot." In this case, even at the same "spot," the same OBD-based data is not always acquired, and there is an occasional variation (for example, traveling at a vehicle speed of 40 km on one occasion or at a vehicle speed of 50 km on one occasion). For this reason, the driving proficiency level determining unit 130 calculates an average value of the "OBD-based data values" (step S108-5).

Further, the "OBD-based data values" used for an average value calculation are preferably OBD-based data accumulated within a predetermined most recent period of time since new data is employed but old data is excluded. For example, only OBD-based data accumulated in last one year can be used. Further, accumulation of OBD-based data in the storage unit 120 is performed within a predetermined period of time (for example, up to one year), and old OBD-based data after a predetermined period of time has elapsed may be deleted from the storage unit 120.

Further, at a timing at which the map 121 stored in the storage unit 120 is updated, accumulated OBD-based data may be once deleted from the storage unit 120, and accumulation of OBD-based data may resume. Further, at a timing at which the driving proficiency level is changed, accumulated OBD-based data may be once deleted from the storage unit 120, and accumulation of OBD-based data may resume.

The driving proficiency level determining unit 130 determines the "driving proficiency level" based on the driving proficiency level determination table and the "OBD-based data value" (the average value of the "OBD-based data values" when the process proceeds to step S108-5) (step S108-6). Specifically, the following description will proceed using the driving proficiency level determination table of FIG. 5 and <OBD-based data 1> mentioned above.

First of all, referring to <OBD-based data 1>, "engine speed": 2000, "vehicle speed": 42, "travel history (positional information)": (x1, y1), "advance angle": 11, and "brake": 0 are described. The "driving proficiency level" is determined by comparing the information with the "spot 01" of the driving proficiency level determination table of FIG. 5. For example, since the "engine speed" is 2000 in <OBD-based data 1>, the "driving proficiency level" of the "engine speed" corresponds to the level 1. Similarly, the "driving proficiency level" of the "vehicle speed" corresponds to the level 1. Similarly, the "driving proficiency level" of the "advance angle" corresponds to the level 3. Similarly, the "driving proficiency level" of the "brake" corresponds to the level 1.

When the "driving proficiency level" is determined, the driving proficiency level determining unit 130 stores or updates the determined driving proficiency level in the storage unit 120 as the driving proficiency level information (step S108-7). The update refers to an operation of overwriting and storing driving proficiency level information when there is already driving proficiency level information. Here, for example, concrete driving proficiency level information is illustrated in FIG. 9.

Further, the "OBD-based data value" is likely to significantly vary depending on a weather condition at that time. For this reason, weather information at a date and time at which the "OBD-based data value" is acquired may be separately acquired, and the "OBD-based data value" may be corrected. Specifically, in the "OBD-based data value," even when traveling is performed at an actual "vehicle speed" of 40 km/h, traveling is assumed to be performed at a "vehicle speed" of 48 km/h obtained by multiplying the actual "vehicle speed", for example, by a correction coefficient 1.2. Through this operation, the highly accurate "driving proficiency level" can be determined according to the weather condition when the "driving proficiency level" is determined based on the driving proficiency level determination table (based on fine weather) and the "OBD-based data value."

Second Process

Figure 12:
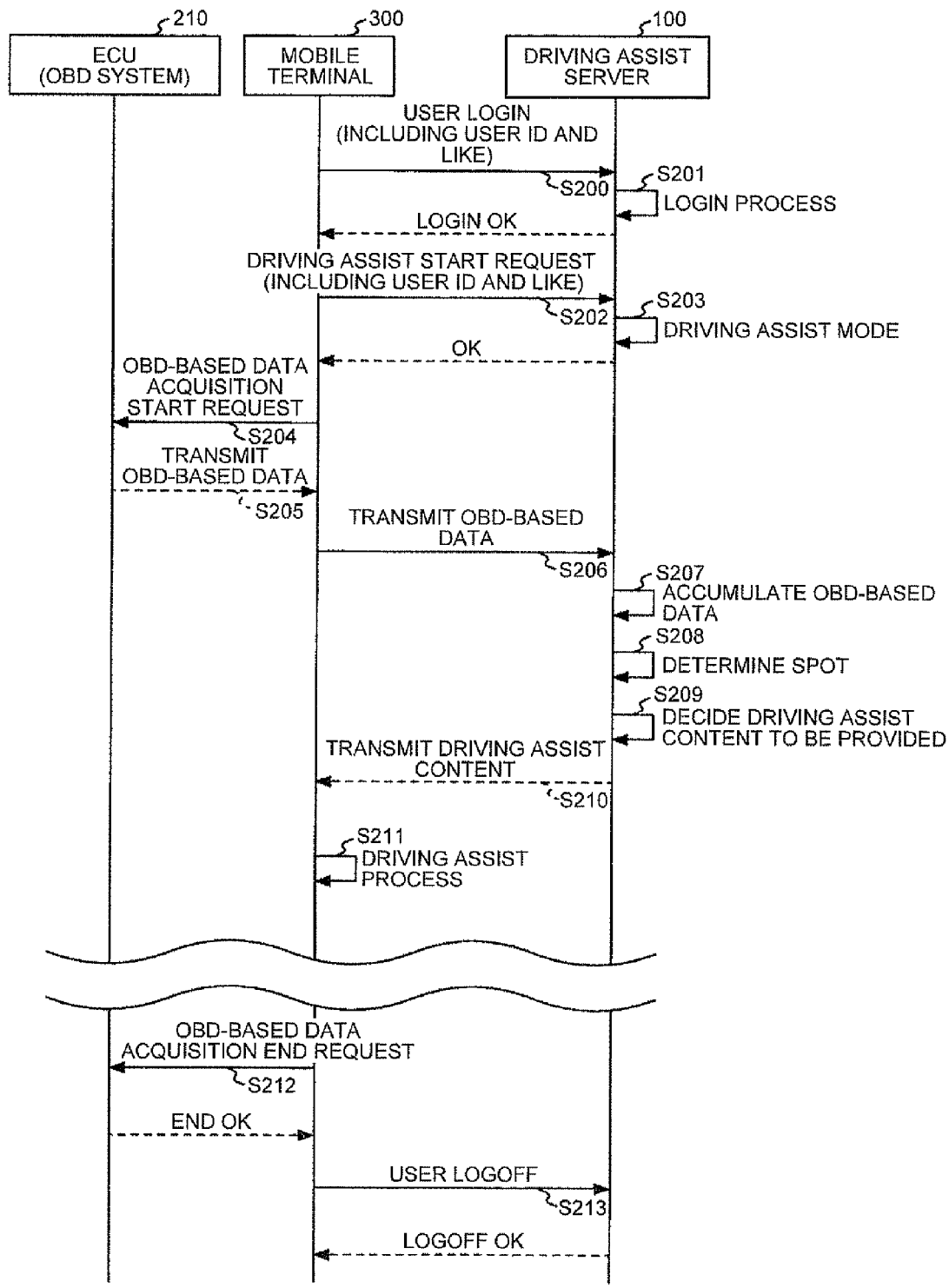
FIG. 12 is a sequence diagram illustrating an exemplary process (second process) of a system.

FIG. 12 is a sequence diagram illustrating an exemplary process (second process) of the system according to the present embodiment. As described above, it is necessary to accumulate at least minimum amount of OBD-based data in order to provide driving assist. Then, after a certain amount of OBD-based data is accumulated, accumulation of OBD-based data is performed while driving assist is provided during driving. The second process will be described focusing on this point.

First of all, when the user gets in the vehicle 200 to start driving, the user accesses the driving assist server 100 and performs the user login operation using the mobile terminal 300 (step S200). The mobile terminal 300 can receive an input of the user ID and then perform the user login operation through a dedicated application.

Upon receiving the user login request, the driving assist server 100 executes the login process based on the user ID (step S201). When the received user ID is the one registered in advance, login is allowed.

Next, in order to request driving assist, the user accesses the driving assist server 100 and makes a driving assist start request using the mobile terminal 300 (step S202). The mobile terminal 300 can make the driving assist start request through a dedicated application.

Upon receiving the driving assist start request, the driving assist server 100 enters a driving assist mode (step S203).

Next, the user transmits an OBD-based data acquisition start request to the ECU 210 (including the OBD system) through the OBD reader 220 using the communication function (for example, WiFi) of the mobile terminal 300 (step S204). As described above, the mobile terminal 300 can make the OBD-based data acquisition start request through a dedicated application, a general-purpose tool, or the like used to access the driving assist server 100.

The ECU 210 transmits the OBD-based data to the mobile terminal 300 through the OBD reader 220 (step S205).

Upon receiving the OBD-based data, the mobile terminal 300 (the vehicle condition information acquiring unit 420) transmits the received OBD-based data to the driving assist server 100 (step S206).

Upon receiving the OBD-based data, the driving assist server 100 causes the received OBD-based data to be accumulated in the storage unit 120 in association with each user ID (step S207). This step is similar to step S105 of FIG. 10.

Next, the driving assist server 100 (the driving assist content providing unit 140) determines whether the vehicle 200 driven by the user is located at a spot at which driving assist content has to be provided (step S208).

Specifically, the "travel history (positional information)" in the OBD-based data received in step S207 is referred to. Then, when "spot" and "moving direction" in the driving assist information table 123 match the "travel history (positional information)" with reference to the driving assist information table 123 of the storage unit 120, it is determined that the vehicle 200 driven by the user is located at a spot at which driving assist content has to be provided. In the present embodiment, the "spot" is a point spot on the map 121 at which the driver has to caution during driving.

When it is determined that the vehicle 200 driven by the user is located at a spot at which driving assist content has to be provided, the driving assist server 100 (the driving assist content providing unit 140) decides driving assist content to be provided (step S209).

Specifically, first of all, the driving proficiency level information of the corresponding user (for example, user01) at the corresponding spot is acquired. For example, referring to FIG. 9, when the position of the vehicle 200 driven by the user is the spot 01 and the moving direction is the downward direction, the user's "driving proficiency level" is as follows.

"engine speed": level 1
"vehicle speed": level 1
"advance angle": level 3
"brake": level 1

Next, "notification content" and "assistance" corresponding to spot 01, down, "engine speed": level 1, "vehicle speed": level 1, "advance angle": level 3, and "brake": level 1 are acquired with reference to FIGS. 6A and 6B. The acquired "notification content" and "assistance" here are as follows:

"notification content": speed is likely to increase at downhill curve. It is dangerous, so please reduce speed to 20 to 30 km and then travel. Please travel using brake sufficiently.

"assistance": speed of 20 to 30 km is maintained when engine speed is adjusted to 1000 to 1500. Please step on brake half before curve.

Further, "notification content" and "assistance" are driving assist content to be provided to the user (for example, user01) at a corresponding spot (for example, the spot 01).

The driving assist server 100 transmits the driving assist content to the mobile terminal 300 (step S210).

Upon receiving the driving assist content, the mobile terminal 300 executes a driving assist process using the driving assist content (step S211). Specifically, for example, the driving assist content may be displayed on a display screen of the mobile terminal 300 or may be provided through voice guidance.

Figure 13:
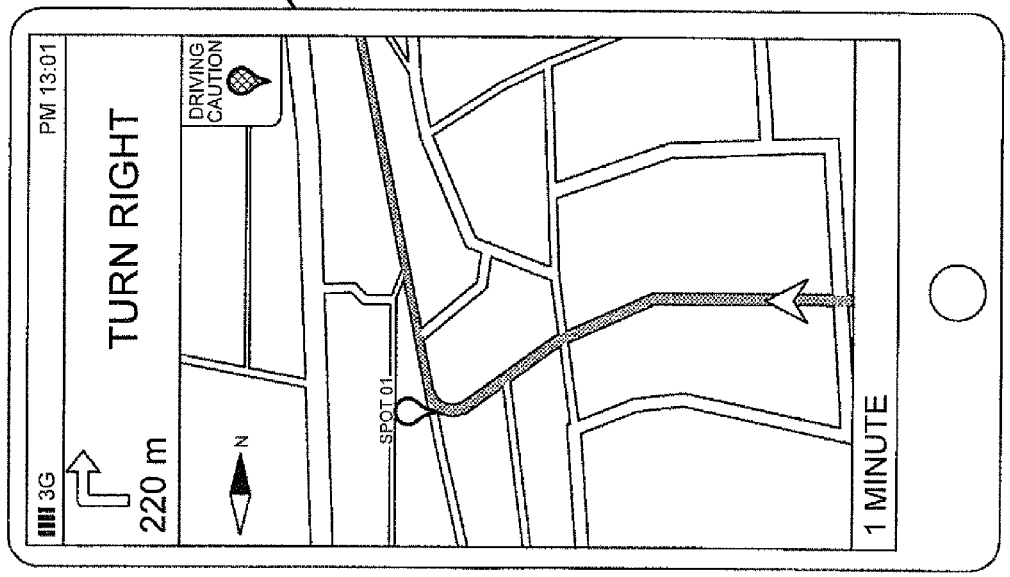
FIG. 13 illustrates a driving assist example.

FIG. 13 illustrates a driving assist example according to the present embodiment. A spot at which driving has to be carefully performed is displayed on a map, and "notification content" and "assistance" including the user's name are guided through a voice based on the user ID.

Specifically, voice guidance such as "Mr. user01, speed is likely to increase at downhill curve. It is dangerous, so please reduce speed to 20 to 30 km and then travel. Speed of 20 to 30 km is maintained when engine speed is adjusted to 1000 to 1500. Further, please travel using brake sufficiently. Please step on brake half before curve." is provided.

Further, "notification content" and "assistance" may be displayed on a screen but are preferably provided through voice guidance for safe driving.

The user (user01) has a habit of driving at a high "engine speed" and a high "vehicle speed" while stepping on a "brake" gently when driving at the spot 01 until then. For this reason, all of the "driving proficiency levels" of the user for the "engine speed," the "vehicle speed," and the "brake" at the spot 01 are determined as the level 1. Thus, the driving assist server 100 provides a specific warning or assistance through voice guidance so that appropriate driving is performed when the user drives at the same spot 01. The user can drive the vehicle appropriately and more safely unlike driving until then since personalized warning or assistance is provided based on his/her past driving habit through his/her own mobile terminal 300.

Further, the map 121 displayed on the screen of the mobile terminal 300 may be provided from the driving assist server 100, and the same map may be stored in the mobile terminal 300 in advance.

Thereafter, steps S204 to S211 are repeatedly performed. Then, when driving of the vehicle 200 ends, for example, just before getting off the vehicle, the user transmits the OBD-based data acquisition end request to the ECU 210 (including the OBD system) through the OBD reader 220 using the communication function (for example, WiFi) of the mobile terminal 300 (step S212). Upon receiving the OBD-based data acquisition end request, the ECU 210 ends transmission of the OBD-based data.

Further, the user accesses the driving assist server 100 and performs the user logoff operation using the mobile terminal 300 (step S213). Upon receiving the user logoff request, the driving assist server 100 ends reception and accumulation of the OBD-based data and the driving assist mode.

In step S108-5, when a plurality of pieces of OBD-based data are accumulated at the same "spot," in order to absorb an occasional variation, the driving proficiency level determining unit 130 calculates the average value of the "OBD-based data values." However, it is difficult to exclude, for example, the presence of an "OBD-based data value" corresponding to the level 1 that has happened just once from the OBD-based data by averaging the "OBD-based data value."

For this reason, the driving assist server 100 may determine the driving proficiency level (for example, FIG. 5) of each of a plurality of pieces of OBD-based data, acquire "notification content" and "assistance" corresponding to a driving proficiency level when a driving proficiency level of the level 1 or 2 is determined even just once, and transmit "notification content" and "assistance" to the mobile terminal 300 as the driving assist content. In this case, for example, when the user who generally drives with the high driving proficiency level such as the level 3 is determined as the driving proficiency level of the level 1 or 2 even just once, "notification content" and "assistance" (for example, FIGS. 6A and 6B) corresponding to the driving proficiency level of the level 1 or 2 are provided, so that the user can drive the vehicle more appropriately and safely.

CONCLUSION

As described above, the driving assist server 100 according to the present embodiment accumulate OBD-based data for each user and determines a driving proficiency level based on OBD-based data of each user. Further, driving assist according to each user's driving proficiency level is provided through a mobile terminal of the user. Thus, for example, even vehicles shared and used by a plurality of drivers such as rental cars or company cars can be provided with route guidance or driving assist corresponding to the driver's driving skill or driving proficiency level. In other words, according to the present embodiment, each driver can be provided with personalized driving assist without depending on an individual vehicle.

For example, in the present embodiment, a driving proficiency level is determined based on "engine speed," "vehicle speed," "advance angle," and "brake" among pieces of OBD-based data. However, this is an example, and appropriate driving assist according to a feature of a corresponding spot can be provided using other OBD-based data.

For example, driving assist related to a timing at which an appropriate blinker is used as an intersection can be provided using "blinker" among pieces of OBD-based data.

According to an embodiment of the present invention, it is possible to provide each driver with personalized driving assist.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Present invention as disclosed herein may be realized according to following notes 1 to 8.

Note 1. A driving assist system comprising:
a vehicle that includes an output device outputting vehicle condition information;
a mobile terminal of a user who drives the vehicle; and
a driving assist device that provides driving assist content to the mobile terminal,
wherein the driving assist device includes
a receiving unit that receives the vehicle condition information of the vehicle and a user identifier of the user who drives the vehicle,
a storage unit that stores the vehicle condition information received by the receiving unit in association with the user identifier, and stores driving proficiency level determination information specifying a driving proficiency level according to the vehicle condition information and driving assist information specifying driving assist content according to the driving proficiency level,
a driving proficiency level determining unit that determines a driving proficiency level of each user based on the vehicle condition information and the driving proficiency level determination information stored in the storage unit, and
a driving assist content providing unit that provides driving assist content corresponding to a driving proficiency level to each user based on the driving proficiency level determined by the driving proficiency level determining unit and the driving assist information stored in the storage unit.

Note 2. The driving assist system according to note 1,
wherein the mobile terminal includes
a vehicle condition information acquiring unit that acquires the vehicle condition information of the vehicle from the output device,
a transmitting unit that transmits the vehicle condition information of the vehicle and the user identifier of the user who drives the vehicle to the driving assist device,
a receiving unit that receives the driving assist content, and
a driving assist unit that provides driving assist based on the driving assist content.

Note 3. The driving assist system according to note 1 or 2,
wherein the driving proficiency level determination information includes a driving proficiency level that is specified for each spot, each moving direction, and each item of the vehicle condition information.

Note 4. The driving assist system according to any one of notes 1 to 3,
wherein the driving assist information includes driving assist content which is specified for each spot, each moving direction, each item of the vehicle condition information, and each driving proficiency level.

Note 5. The driving assist system according to any one of notes 1 to 4,
wherein the driving assist content includes at least either of notification content for notifying of caution during driving and assistance information for assisting with a driving skill.

Note 6. A driving assist device that provides driving assist content to a mobile terminal of a user who drives a vehicle including an output device outputting vehicle condition information, the driving assist device comprising:
a receiving unit that receives the vehicle condition information of the vehicle and a user identifier of a user who drives the vehicle;
a storage unit that stores the vehicle condition information received by the receiving unit in association with the user identifier, and stores driving proficiency level determination information specifying a driving proficiency level according to the vehicle condition information and driving assist information specifying driving assist content according to the driving proficiency level;

a driving proficiency level determining unit that determines a driving proficiency level of each user based on the vehicle condition information and the driving proficiency level determination information; and a driving assist content providing unit that provides driving assist content corresponding to a driving proficiency level to each user based on the driving proficiency level determined by the driving proficiency level determining unit and the driving assist information.

Note 7. A driving assist method performed by a driving assist device in a driving assist system including a vehicle that includes an output device outputting vehicle condition information, a mobile terminal of a user who drives the vehicle, and the driving assist device that provides driving assist content to the mobile terminal, the driving assist method comprising:

receiving the vehicle condition information of the vehicle and the user identifier of a user who drives the vehicle;

storing the vehicle condition information and the user identifier which are received in the receiving of the vehicle condition information in a storage unit in association with each other;

reading the vehicle condition information, driving proficiency level determination information specifying a driving proficiency level according to the vehicle condition information, and driving assist information specifying driving assist content according to the driving proficiency level from the storage unit;

determining a driving proficiency level of each user based on the vehicle condition information and the driving proficiency level determination information;

providing the driving assist content according to the driving proficiency level to each user based on the driving proficiency level determined in the determining of the driving proficiency level and the driving assist information.

Note 8. A non-transitory computer-readable storage medium with an executable program stored thereon, the program causing a computer, which is a driving assist device that provides driving assist content to a mobile terminal of a user who drives a vehicle including an output device outputting vehicle condition information, to function as:

a receiving unit that receives the vehicle condition information of the vehicle and the user identifier of a user who drives the vehicle;

a storage unit that stores the vehicle condition information received by the receiving unit in association with the user identifier, and stores driving proficiency level determination information specifying a driving proficiency level according to the vehicle condition information and driving assist information specifying driving assist content according to the driving proficiency level;

a driving proficiency level determining unit that determines a driving proficiency level of each user based on the vehicle condition information and the driving proficiency level determination information; and a driving assist content providing unit that provides driving assist content corresponding to a driving proficiency level to each user based on the driving proficiency level determined by the driving proficiency level determining unit and the driving assist information.

What is claimed is:

1. A driving assist system comprising:
a vehicle that includes an output device outputting vehicle condition information;
a mobile terminal of a user who drives the vehicle; and
a driving assist device configured to provide driving assist content to the mobile terminal, wherein the driving assist device includes at least one processor configured to:
receive the vehicle condition information of the vehicle from the output device and a user identifier of the user who drives the vehicle from the mobile terminal,
store the received vehicle condition information in association with the user identifier, driving proficiency level determination information specifying a driving proficiency level for the user according to the vehicle condition information associated with the user identifier, and driving assist information specifying driving assist content for the user according to the driving proficiency level associated with the user identifier, the driving assist content being specified for each spot, each moving direction, each item of the vehicle condition information, and each driving proficiency level,
determine a driving proficiency level of the user based on the stored vehicle condition information and the stored driving proficiency level determination information, and
provide the driving assist content corresponding to a driving proficiency level of the user to the mobile terminal based on the determined driving proficiency level and the stored driving assist information.

2. The driving assist system according to claim 1, wherein the processor is further configured to:
acquire the vehicle condition information of the vehicle from the output device,
transmit the vehicle condition information of the vehicle and the user identifier of the user who drives the vehicle to the driving assist device,
receive the driving assist content, and
provide driving assist based on the driving assist content.

3. The driving assist system according to claim 1, wherein the driving proficiency level determination information includes a driving proficiency level that is specified for each spot, each moving direction, and each item of the vehicle condition information.

4. The driving assist system according to claim 1, wherein the driving assist content includes at least either of notification content for notifying of caution during driving and assistance information for assisting with a driving skill.

5. A driving assist method performed by a driving assist device in a driving assist system including a vehicle that includes an output device outputting vehicle condition information, a mobile terminal of a user who drives the vehicle, and the driving assist device that provides driving assist content to the mobile terminal, the driving assist method comprising:
receiving the vehicle condition information of the vehicle from the output device and a user identifier of a user who drives the vehicle from the mobile terminal;
storing the received vehicle condition information in association with the user identifier;
reading the vehicle condition information, driving proficiency level determination information specifying a driving proficiency level for the user according to the vehicle condition information, and driving assist information specifying driving assist content for the user according to the driving proficiency level associated with the user identifier, the driving assist content being specified for each spot, each moving direction, each item of the vehicle condition information, and each driving proficiency level;

determining a driving proficiency level of the user based on the vehicle condition information and the driving proficiency level determination information;

providing the driving assist content according to the driving proficiency level of the user to the mobile terminal based on the determined driving proficiency level and the stored driving assist information.

6. A non-transitory computer-readable storage medium with an executable program stored thereon, the program causing a computer, which is a driving assist device that provides driving assist content to a mobile terminal of a user who drives a vehicle including an output device outputting vehicle condition information, to function to:

receive the vehicle condition information of the vehicle from the output device and a user identifier of the user who drives the vehicle from the mobile terminal;

store the received vehicle condition information in association with the user identifier, driving proficiency level determination information specifying a driving proficiency level for the user according to the vehicle condition information associated with the user identifier, and driving assist information specifying driving assist content for the user according to the driving proficiency level associated with the user identifier, the driving assist content being specified for each spot, each moving direction, each item of the vehicle condition information, and each driving proficiency level;

determine a driving proficiency level of the user based on the stored vehicle condition information and the stored driving proficiency level determination information; and provide the driving assist content corresponding to a driving proficiency level of the user to the mobile terminal based on the determined driving proficiency level and the stored driving assist information.

\* \* \* \* \*